INVENTOR
W. A. GEYGER

BY [signature]
R. M. Hicks
ATTORNEYS

INVENTOR
W. A. GEYGER

BY G. D. O'Brien
R. M. Hicks
ATTORNEYS

May 4, 1954 W. A. GEYGER 2,677,796

TWO-PHASE INDUCTION MOTOR MAGNETIC AMPLIFIER WITH DIRECT CURRENT BRAKING

Filed March 11, 1952 9 Sheets-Sheet 3

INVENTOR
W. A. GEYGER

BY G. D. O'Brien
R. M. Hicks
ATTORNEYS

INVENTOR
W. A. GEYGER

BY
ATTORNEYS

May 4, 1954

W. A. GEYGER

TWO-PHASE INDUCTION MOTOR MAGNETIC AMPLIFIER WITH DIRECT CURRENT BRAKING 2,677,796

Filed March 11, 1952

9 Sheets-Sheet 5

INVENTOR
W. A. GEYGER

BY G. D. O'Brien
R. M. Hicks
ATTORNEYS

INVENTOR
W. A. GEYGER

BY G. D. O'Brien
R. M. Hicks
ATTORNEYS

May 4, 1954 W. A. GEYGER 2,677,796

TWO-PHASE INDUCTION MOTOR MAGNETIC AMPLIFIER WITH DIRECT CURRENT BRAKING

Filed March 11, 1952 9 Sheets-Sheet 7

INVENTOR
W. A. GEYGER

BY G. D. O'Brien
R. M. Hicks ATTORNEYS

INVENTOR
W. A. GEYGER

BY G. D. O'Brien
R. M. Hicks
ATTORNEYS

INVENTOR
W. A. GEYGER

BY G. D. O'Brien
R. M. Hicks
ATTORNEYS

Patented May 4, 1954

2,677,796

UNITED STATES PATENT OFFICE 2,677,796

TWO-PHASE INDUCTION MOTOR MAGNETIC AMPLIFIER WITH DIRECT CURRENT BRAKING

Wilhelm A. Geyger, Washington, D. C., assignor to the United States of America as represented by the Secretary of the Navy Application March 11, 1952, Serial No. 276,027

12 Claims. (Cl. 318—203)

(Granted under Title 35, U. S. Code (1952), sec. 266)

The invention described herein may be manufactured and used by or for the government of the United States of America for governmental purposes without payment of any royalties thereon or therefor.

This invention comprises novel and useful improvements in magnetic amplifiers and more particularly pertains to improvements in magnetic servo-amplifiers.

Small two-phase induction motors are extensively used in high-performance servomechanisms, some of which motors have inherent damping characteristics. Separately excited induction motor type reversible motors, as are sometimes used in self-balancing potentiometer recorders, have a permanent magnet producing eddy current damping, and some constructions of low-inertia squirrel-cage induction motors and drag cup type motors have eddy-current damping devices built into the motor. There are, however, other constructions of such motors which have no damping properties so that additional damping methods must be employed to prevent hunting.

Heretofore, it has been known to introduce effective dynamic braking of a two-phase cage armature type motor by means of an electronic servo-amplifier of the push-pull type. In such devices dynamic braking is effected by the direct current component of the plate current which flows through the plate circuit containing the amplifier field winding of the two-phase induction motor. However, if such a motor is to be controlled by means of a magnetic servo amplifier, considerable difficulties will be encountered since the alternating load current of the conventional magnetic amplifiers of the balance detector type do not have a direct current component which may be used for producing dynamic braking of the motor.

The present invention relates to a magnetic amplifier for use in conjunction with those types of two-phase induction motors having no damping properties, the amplifier feeding the amplifier field winding of the alternating current reversible motor by a variable unidirectional current having an alternating current component and a direct current component which produces an effective dynamic braking of the motor, preferably in such a way that the direct current component increases when the alternating current component decreases, and vice versa.

The direct current component may, within the scope of the present invention, be superimposed in the amplifier field winding of the motor by a separate circuit which operates in conjunction with the magnetic amplifier, which circuit may be designed to produce a constant direct current to effectuate braking of the motor or, alternatively may produce a braking current which increases as the alternating load current decreases. In the preferred embodiment of the invention, the magnetic amplifier itself, produces a unidirectional load current which contains an alternating current component and a direct current component which effects the desired braking of the motor.

The production of the desired braking current is achieved in the present invention in a two-element full-wave magnetic amplifier having the amplifier field windings of the alternating current induction type motor connected thereto in such a manner that the sum of the load currents from the separate load windings on the reactor elements flow therethrough and produce additive effects. The control windings on the reactor elements are arranged so that push-pull action is obtained, that is the magneto-motive force due to the control current in the control windings on one reactor element aids the magneto-motive force due to the load current in the load windings on that reactor element while the magneto-motive force due to the control current in the control windings on the other reactor element opposes the magneto-motive force due to the flow of load current through the load windings, thereon. Bias is provided to operate the reactor elements at the proper level so that a large direct current component flows through the amplifier field winding of the two-phase motor when the control signal is zero.

The push-pull operated full-wave magnetic amplifier effects the production of the desired damping current which may be adjusted by proper bias to be a maximum when the error signal is zero, and decreases with increasing error signal. Additionally, the phase of the alternating current component of the load current is correlative with the polarity of the error or control signal. However, in contrast to conventional direct current control circuitry, large voltages of fundamental frequency will be induced in the control windings of the full-wave push-pull type magnetic amplifier. Special circuitry for the input stage of such an amplifier must therefore be employed to decouple the output stage in such a way that no appreciable alternating voltage of the fundamental supply frequency will be induced in the synchrotransformer alternating current control circuit which has a high impedance.

An important object of this invention is to provide dynamic braking for an alternating current induction type motor which is controlled by a magnetic servo-amplifier, which motor has no inherent dynamic braking characteristics.

Another object of this invention is to provide a damping current for an alternating current induction motor which is controlled by a magnetic amplifier, the amplitude of which damping current is inversely related to the amplitude of the control signal applied to the magnetic amplifier whereby maximum damping of the motor is obtained in proximity to the null point, with decreased damping with large control signals, thereby permitting faster rotor movement towards the null point.

Another object of this invention is to provide a magnetic amplifier having a unidirectional total load current, which load current has a direct current and an alternating current component, the alternating current component being correlative in amplitude and phase with the amplitude and polarity of the control signal applied to the amplifier, and the direct current component being inversely related to the amplitude of the control signal.

Yet another object of this invention is to provide a magnetic amplifier having inherent constant-current characteristics whereby the load current is not materially affected by fluctuations in the supply voltage.

Other objects and many of the attendant advantages of this invention will be readily appreciated as the same becomes better understood by reference to the following detailed description when considered in connection with the accompanying drawings wherein.

Figure 1:
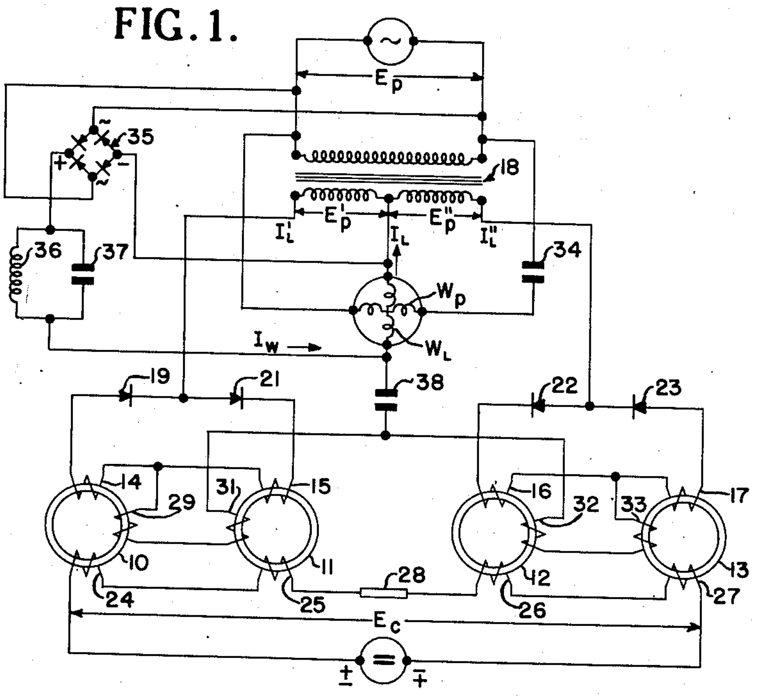
Fig. 1 is a schematic diagram of a polarized magnetic amplifier of the self-saturation type for control of an alternating current two-phase motor including an auxiliary circuit for superimposing a damping current in one of the motor field windings.

Reference is now made more specifically to Fig. 1 of the drawings wherein there is illustrated an auxiliary circuit for superimposing a constant unidirectional damping current in the amplifier field windings of an alternating current cage-armature type motor, which field winding has an alternating current supplied by a conventional push-pull magnetic amplifier of the self-saturation type.

The amplifier includes four cores 10, 11, 12 and 13 having load windings 14, 15, 16 and 17 respectively. The load windings 14 and 15 are connected, in separate parallel branch circuits which are energized by the voltage $E_p'$ from one half of the secondary of transformer 18, the branch circuits including asymmetrical conducting elements 19 and 21, such as selenium rectifiers. The polarities of these elements are oppositely arranged so that the positive half-waves of current flow through winding 15 and the negative half-waves of current flow through winding 14. Similarly, the load windings 16 and 17 are connected in separate branch circuits with asymmetrical conducting elements 22 and 23 respectively, the winding 16 being energized by the voltage $E_p''$ from the other half of the secondary of the transformer 18 during the positive half-cycle of the voltage $E_p''$ and the winding 17 being energized during the negative half cycle. Control windings 24, 25, 26 and 27 are provided on the cores 10, 11, 12 and 13 respectively. The control windings 24 and 25 are connected in series opposition with each other and through series resistor 28 with the series opposed control windings 26 and 27, the control windings being energized by the control voltage $E_c$. Thus the voltages of the fundamental supply frequency induced in the control windings by transformer action, due to the load current flowing in the load windings, cancel each other. Self-excitation windings 29, 31, 32 and 33 are provided on the cores 10, 11, 12 and 13 respectively and provide the desired feedback effects whereby each of the half-wave circuits function as a polarized magnetic amplifier. The half wave circuits are operated in push-pull by the transformer 18 and supply an alternating current signal of a phase dependent on the polarity of the control voltage $E_c$ to the common load comprising the amplifier field windings $W_L$ of a two-phase induction motor. An alternating current of the supply frequency is supplied through phasing condenser 34 to the other winding $W_p$ of the motor.

A constant direct current $I_w$ is obtained from the bridge rectifier 35 which is connected to the alternating current supply $E_p$, which direct current is applied through an L–C filter circuit comprising inductor 36 and condenser 37 to the amplifier field windings $W_L$. A blocking condenser 38 is provided to isolate the damping current $I_w$ from the self-excitation windings, the L–C filter preventing the resultant alternating load current of the magnetic amplifier from flowing through the auxiliary circuit. In this way constant dynamic braking of the alternating current motor may be achieved by the superimposed direct current component of the unidirectional current $I_w$.

Figure 2:
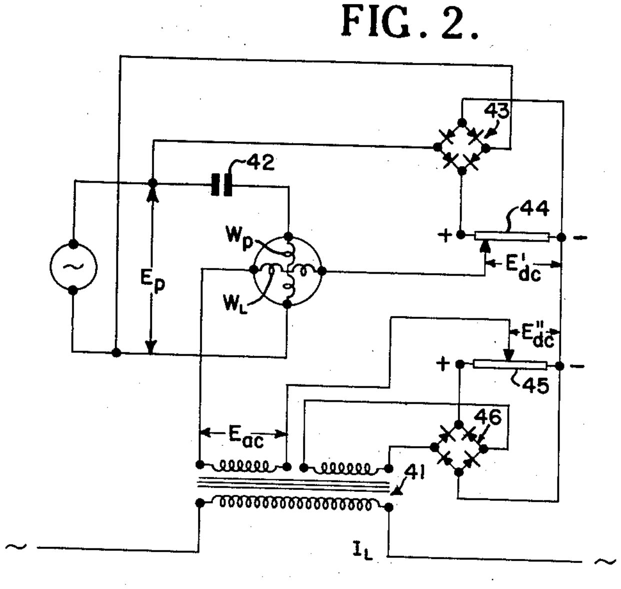
Fig. 2 is a schematic diagram of a circuit for use in conjunction with a magnetic amplifier to superimpose a damping current in one of the motor field windings, the amplitude of which damping current is inversely related to the amplitude of the alternating current flowing through the motor field winding.

Fig. 2 represents a second embodiment by means of which a variable direct damping current may be superimposed in the amplifier field windings of an alternating current induction motor. In this embodiment the primary of transformer 41 preferably represents the load of a polarized magnetic amplifier. The voltage $E_{ac}$ from the secondary of transformer 41 is applied in series with the voltages $E_{dc}'$ and $E_{dc}''$ to the amplifier field windings $W_L$ of a two-phase inductor motor, the other winding of the motor being energized by the alternating voltage $E_p$ which is applied through phasing capacitor 42.

The voltage $E_{dc}'$ is a constant unidirectional voltage obtained from the alternating current source $E_p$ through bridge rectifier 43 and may be adjusted to the desired level by potentiometer 44. The voltage $E_{dc}''$ is a unidirectional voltage in series opposition to the voltage $E_{dc}'$, which voltage appears across adjustable potentiometer 45. This latter voltage is a voltage proportional to the voltage induced in a second secondary winding of the transformer 41 by the load current $I_L$ flowing through the primary thereof, which induced voltage is rectified by bridge rectifier 46 and applied to the potentiometer 45. Thus, as the load current $I_L$ increases, the voltage $E_{dc}''$ increases, thereby decreasing the resultant unidirectional potential $[E_{dc}'-E_{dc}'']$ applied to the amplifier field winding $W_L$. The damping current which flows through field winding $W_L$ is thus a maximum when there is no alternating load current, and decreases with increasing load current $I_L$. Variations of the direct current in the windings $W_L$ thus permits faster rotor movement towards the null point and slower movement coincident with lower $I_L$ values characterizing close proximity to the null point.

Figure 3:
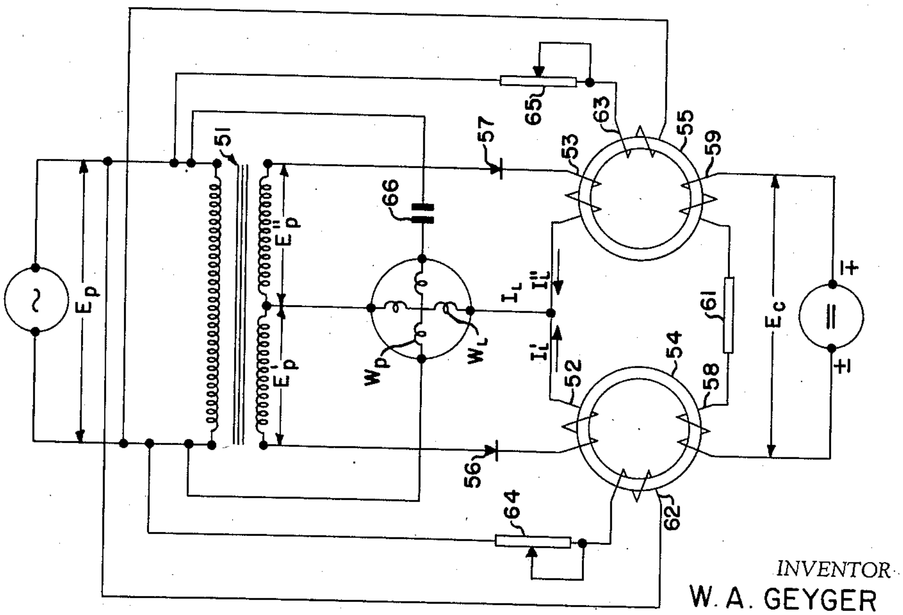
Fig. 3 is a schematic diagram of a power transfer type full-wave magnetic amplifier circuit having inherent dynamic braking characteristics and arranged for push-pull operation by a direct current control signal.

Reference is now made to Fig. 3 wherein there is illustrated a full-wave type magnetic amplifier having the control windings arranged so that push-pull action is obtained when the control windings are energized by D. C. control voltage $E_c$. The circuit includes a center-tapped supply transformer 51 providing two equal voltages $E_p'$ and $E_p''$ which are proportional to the power supply voltage $E_p$. Load windings 52 and 53 are provided on each of two preferably equally rated saturable reactor elements 54 and 55 which are energized through asymmetrical conducting elements 56 and 57. The asymmetrical conductors are so arranged that load current $I_L'$ flows through the load winding 52 during one half-cycle of the supply voltage, and load current $I_L''$ flows through the load winding 53 during the other half-cycle, the amplifier field winding $W_L$ constituting an alternating current load through which the load currents $I_L'$ and $I_L''$ flow in such a manner as to produce additive direct current effects. Direct current control windings 58 and 59 are provided on the reactor elements 54 and 55 and are series connected through resistor 61, the control windings being so arranged that the amplifier operates in push-pull, that is, the magneto-motive force due to the control current in the control windings on one reactor element aids the magneto-motive force due to the load current which flows through the load windings thereon and, the control current in the control windings on the other reactor element opposes the magneto-motive force due to the load current flowing through the load windings thereon. Alternating current bias circuits including windings 62 and 63 with variable series resistors 64 and 65 are provided to eliminate differences in magnetic properties of the two saturable reactor elements and to bring the operating point of these reactor elements to a position to effectuate the production of the most favorable dynamic braking characteristics. Additionally, it is to be noted that the alternating current bias windings illustrated can be rated in such a way that they produce inherent constant-current characteristics in the magnetic amplifier since variations in supply voltage $E_p$ produce corresponding variations in the bias. Thus the circuit has a very small drift error and the performance of the servomechanism is not appreciably affected by changes in power supply voltage.

The line field winding $W_p$ of the motor is energized from the supply source $E_p$ through phasing condenser 66.

Figure 4:
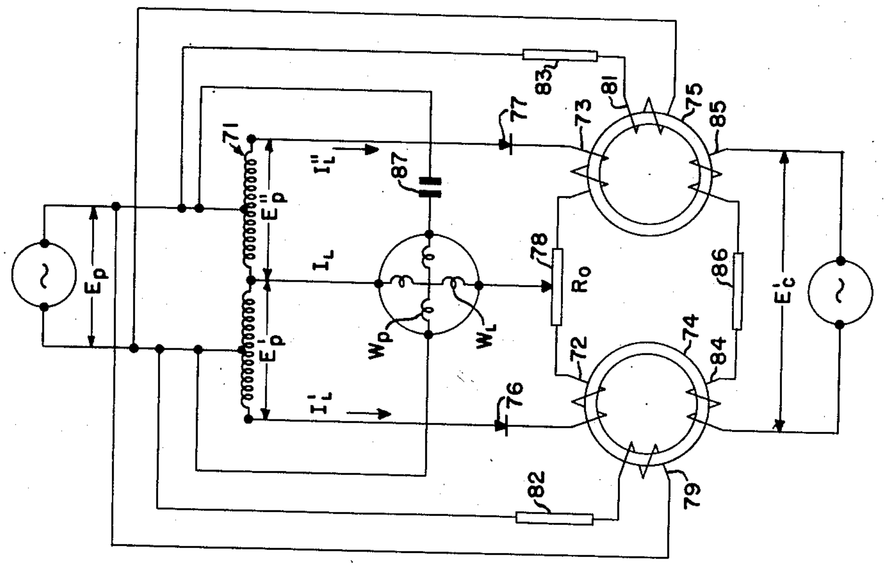
Fig. 4 is a schematic diagram of a transformer input type full-wave magnetic amplifier circuit having inherent constant current characteristics and arranged for push-pull operation by an alternating current control signal.

Fig. 4 illustrates a slightly modified form of the invention in which the transformer 71 provides two equal voltages $E_p'$ and $E_p''$. The load windings 72 and 73 on the saturable reactor elements 74 and 75 are respectively energized through asymmetrical conductors 76 and 77 whereby load current $I_L'$ flows through load winding 72 during one half cycle of the supply voltage and load current $I_L''$ flows through load winding 73 during the other half cycle. The amplifier field winding $W_L$ constitutes a common alternating current load through which the load currents $I_L'$ and $I_L''$ of the separate reactor elements flow in such a direction as to produce additive direct current effects. The potentiometer 78 is provided to eliminate the differences in the magnetic properties of the reactor elements, the potentiometer being adjusted so that the reversible motor does not move if the control voltage $E_c'$ is zero.

As in the preceding embodiment, alternating current bias is provided to bring the operating point of the reactor elements to the proper level. For this purpose, separate alternating current bias circuits including bias windings 79, 81 and fixed resistors 82, 83 are provided, which bias circuits also serve to eliminate the differences in the magnetic properties of the two saturable reactor elements and produce inherent constant-current characteristics in the amplifier. The alternating current control windings 84 and 85 on reactor elements 74 and 75 respectively are series-connected through resistor 86 and arranged so that push-pull action is obtained when the control windings are energized by an alternating control voltage $E_c'$, preferably of the same frequency as the supply voltage $E_p$. Thus, the magneto-motive force due to the control windings on one reactor element aids the magneto-motive force due to the load current which flows through the load windings on that reactor element and the magneto-motive force due to the control windings on the other reactor element opposes the magneto-motive force due to the load current which flows the load winding thereon.

The line field winding $W_p$ is energized through phasing capacitor 87 from the supply source $E_p$, as in the preceding embodiment.

The embodiments illustrated in Figs. 3 and 4 function in the same manner, the primary difference being that the control windings in Fig. 3 are arranged to effectuate push-pull action in response to the application of a slowly varying direct current error signal, while the control windings in Fig. 4 are arranged to effectuate push-pull operation of the magnetic amplifier in response to alternating current control signals having a frequency equal to that of the supply voltage.

Figure 5:
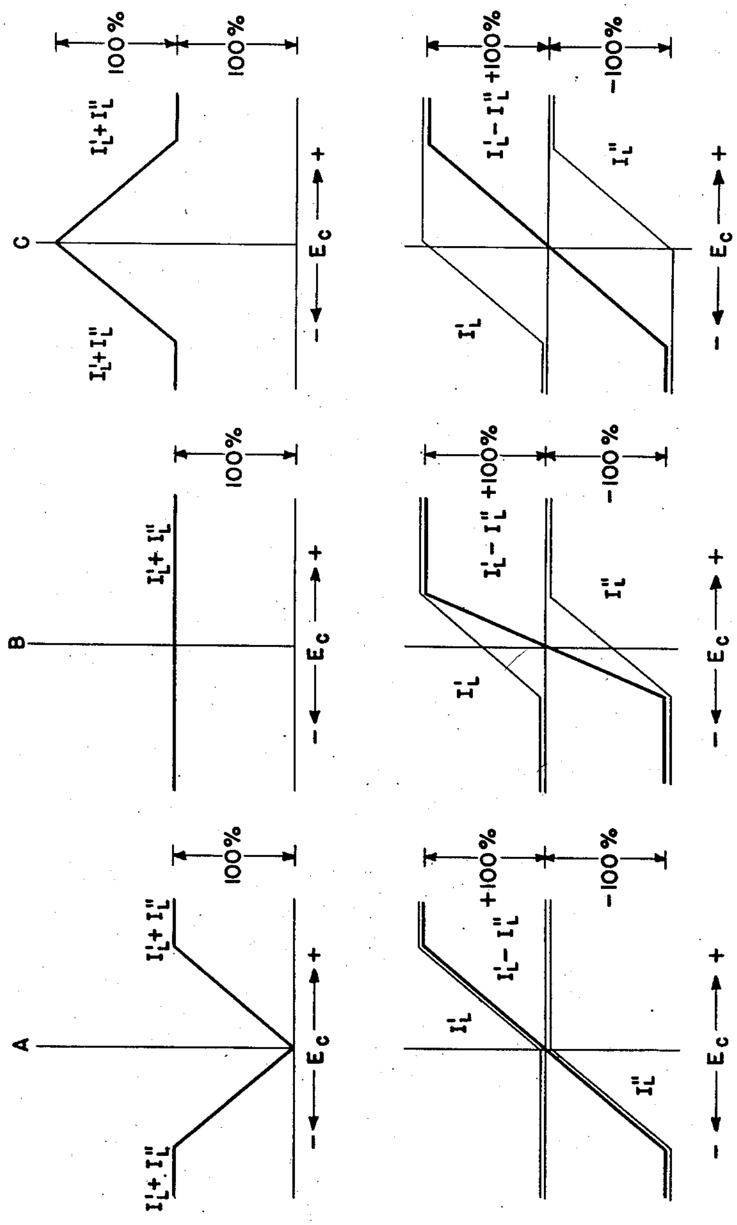
Figs. 5A, 5B and 5C illustrate the operating characteristics of the magnetic amplifier motor control circuits of Figs. 3 and 4 corresponding to three different bias levels.

Figs. 5A, 5B and 5C illustrate the variations in the alternating current and direct current components of the load current in response to variations in the control voltage $E_c$ for three different values of bias excitation corresponding respectively to high, medium and low bias excitation, where low bias excitation is that excitation necessary to produce maximum load current in each of the load windings on the reactor element when the control voltage is zero.

As is apparent from Figs. 5A, 5B and 5C, the amplifier functions as a polarized amplifier, as evidenced by the characteristics indicating the variations in the difference in the load currents $I_L'$ and $I_L''$ in response to changes in control voltage $E_c$. However in Fig. 5A, corresponding to high bias excitation conditions, the direct current component which is correlative with the sum of the load currents $I_L'$ and $I_L''$, is a minimum for zero control voltage and increases with increasing control voltage $E_c$. This is generally not desirable since the speed of the motor is decreased with higher signal voltages and there is practically no braking in proximity to the null point. In Fig. 5B the load currents $I_L'$ and $I_L''$ are about 50% of maximum load current, when the control voltage $E_c$ is zero, and there is a large and constant damping current $I_L'+I_L''$.

In Fig. 5C the bias is such that when the control voltage is zero, the load current $I_L'$ and $I_L''$ have nearly their maximum values and there is a large damping current proportional to $[I_L'+I_L'']$. The damping current decreases as the control voltage $E_c$ increases. This variable damping effect which is produced by the changing of the direct current component $[I_L'+I_L'']$ permits faster rotor movement toward the null point and slower mivement coincident with the lower values of signal voltage $E_c$ characterizing close proximity to the null point. Then, the direct current component of the total load current tends to lock the motor in the position assumed at the instant alternating current excitation ceases.

Figure 6:
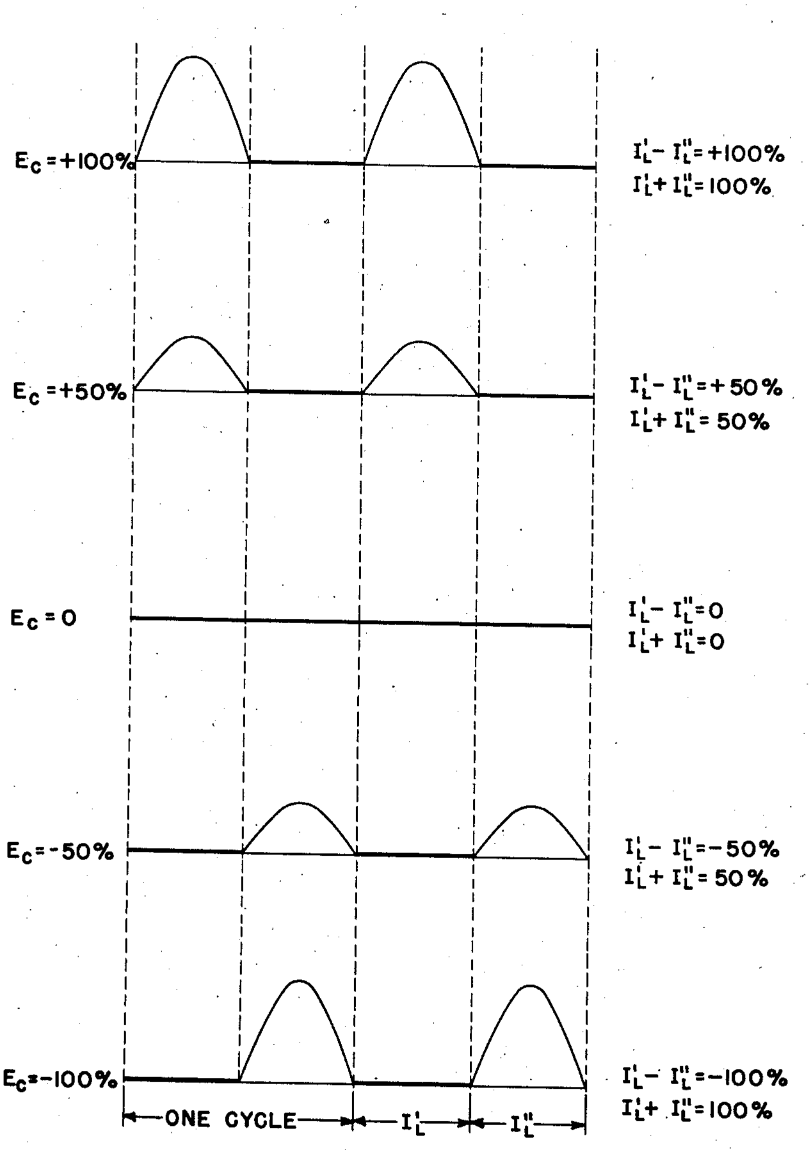
Figs. 6, 7 and 8 illustrate the amplitudes of the output load current pulses for various values of control voltage with the reactor elements operated at bias levels corresponding to the bias levels of Figs. 5A, 5B and 5C respectively.
Figure 7:
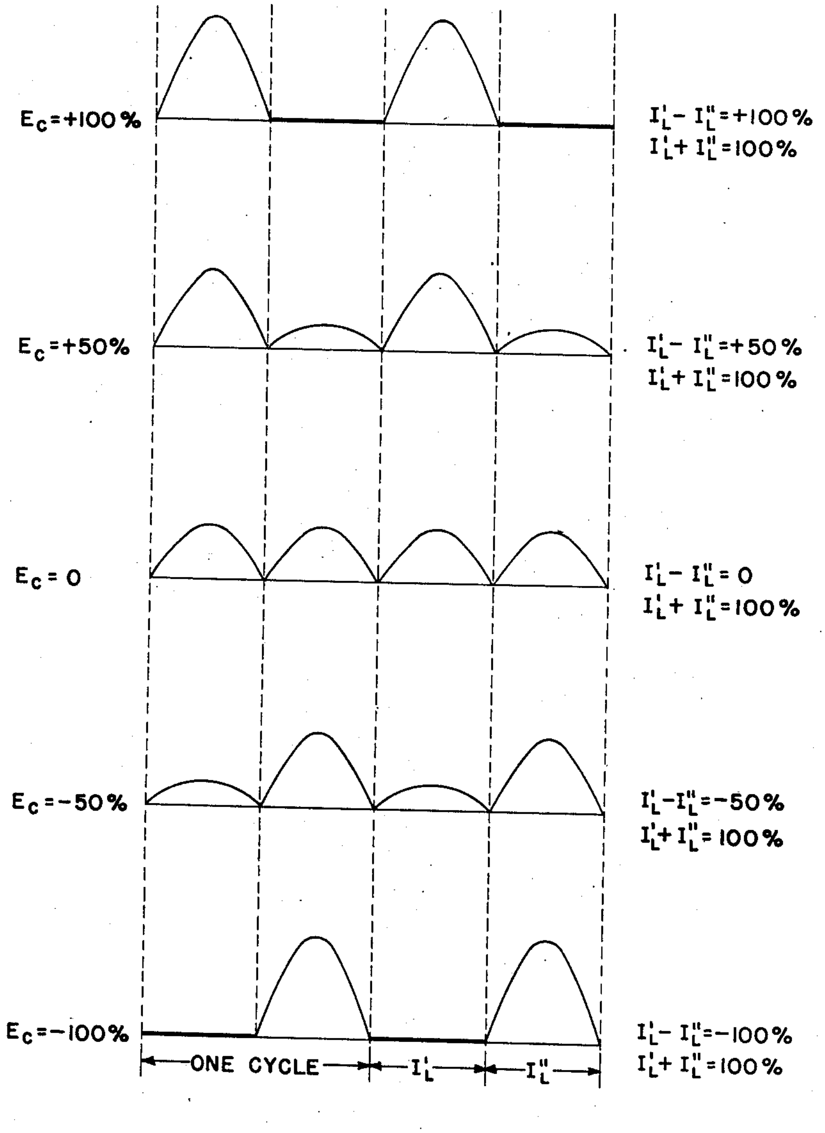
Figure 8:
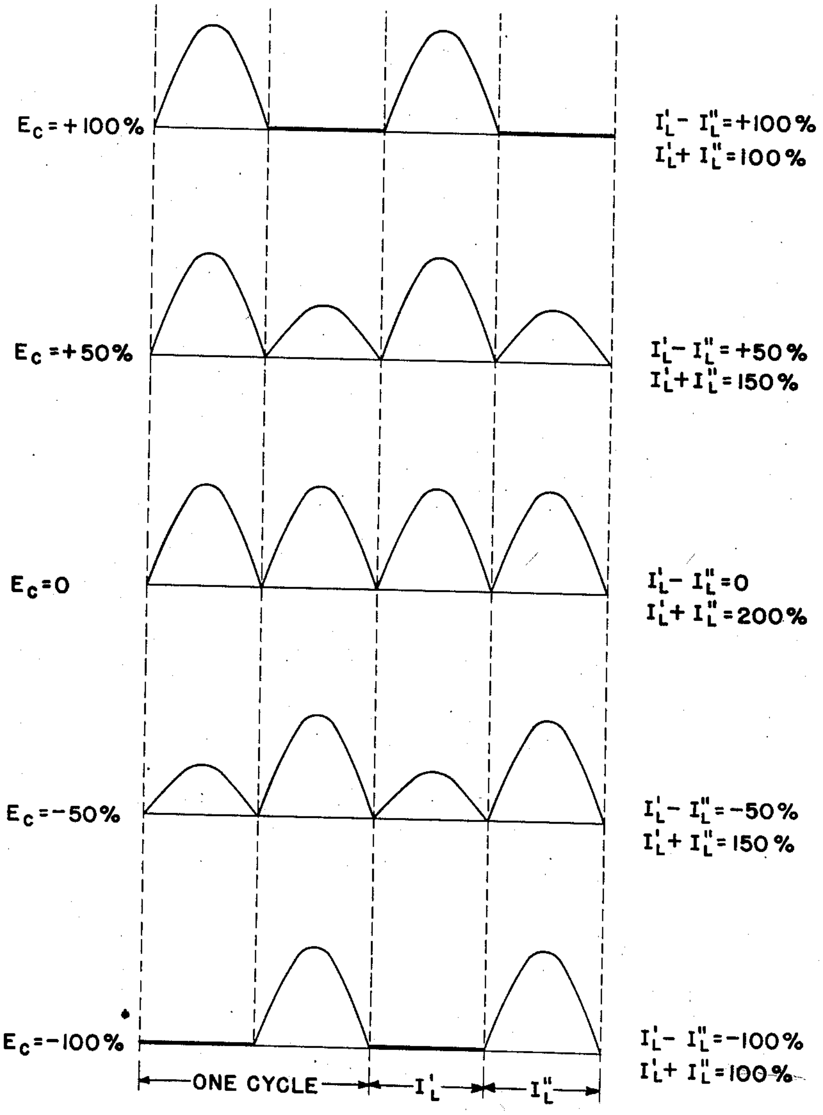

Figs. 6, 7 and 8 illustrate the relative amplitudes of the two half-cycle pulses of load current $I_L'$ and $I_L''$ for various values of control voltage $E_c$. The level of bias excitation in Figs. 6, 7 and 8 was respectively high, medium and low and correspond to the operating conditions of 5A, 5B and 5C. The values $I_L'-I_L''$ of the fundamental alternating current component of the total load current $I_L$, and values $I_L'+I_L''$ of the direct current component of the total load current, are indicated for each of the different values of control voltages $E_c$.

In a two-element full-wave magnetic amplifier, as shown in Figs. 3 and 4, having series-connected control windings arranged for push-pull action, there are comparatively large alternating current voltages of the fundamental supply frequency induced in the control windings, even when the turn ratio of the control windings to the load windings has a small value. An input-stage magnetic amplifier, as illustrated in Figs. 9 and 10, was, therefore, utilized as a decoupling device in order that no appreciable alternating voltage be induced in the control circuit of the source of error signal.

The input-stage circuit to be combined with the direct current controlled output stage circuit must also function as a push-pull type magnetic amplifier to produce a direct current which is a function of the reversible error signal and which is utilized to control the output stage; act as a phase discriminator so that the direction of the direct current output will correspond to the actual phase displacement [0° or 180°] between the error voltage and the power supply voltage; and function as a voltage-sensitive alternating current bias element of the output stage circuit to introduce the desired constant-current characteristics.

Figure 9:
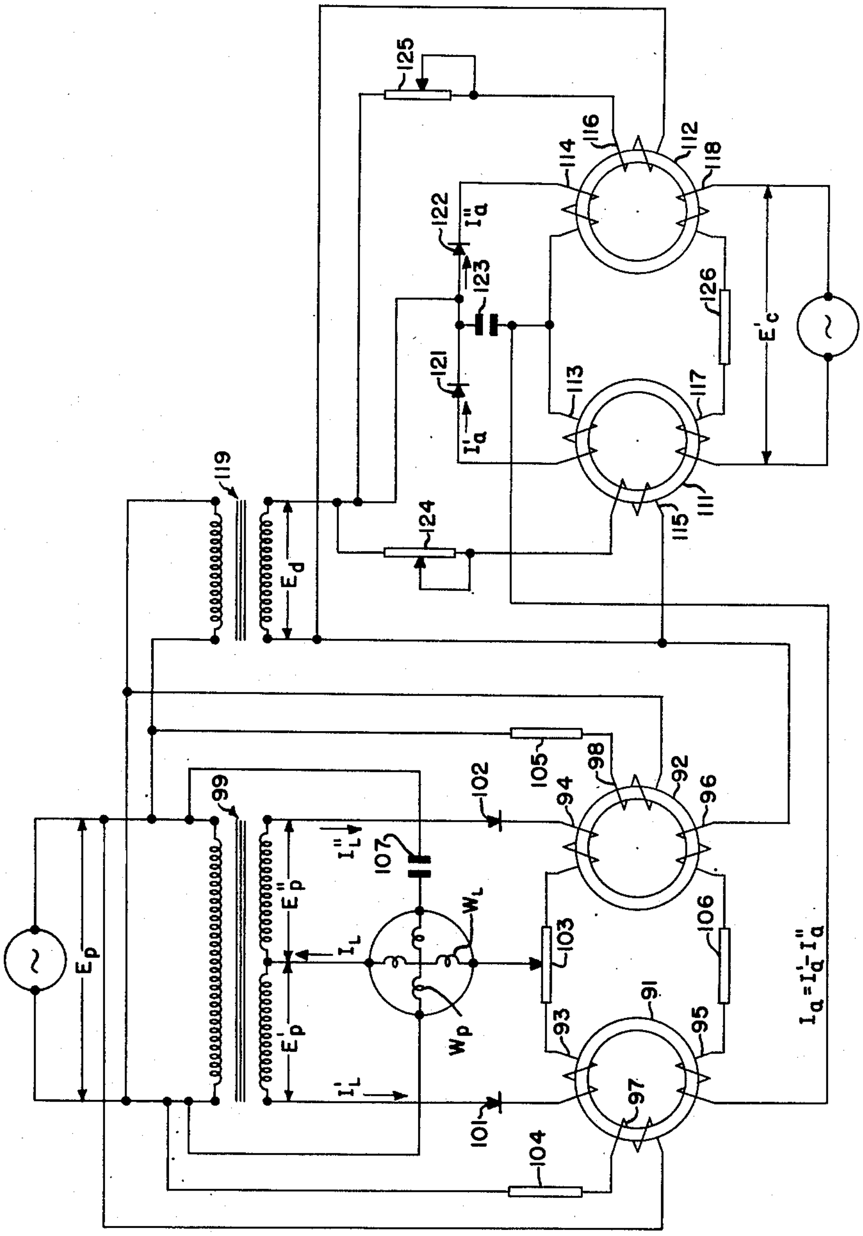
Fig. 9 is a schematic diagram of a two-stage magnetic amplifier motor control circuit having inherent dynamic braking characteristics.
Figure 10:
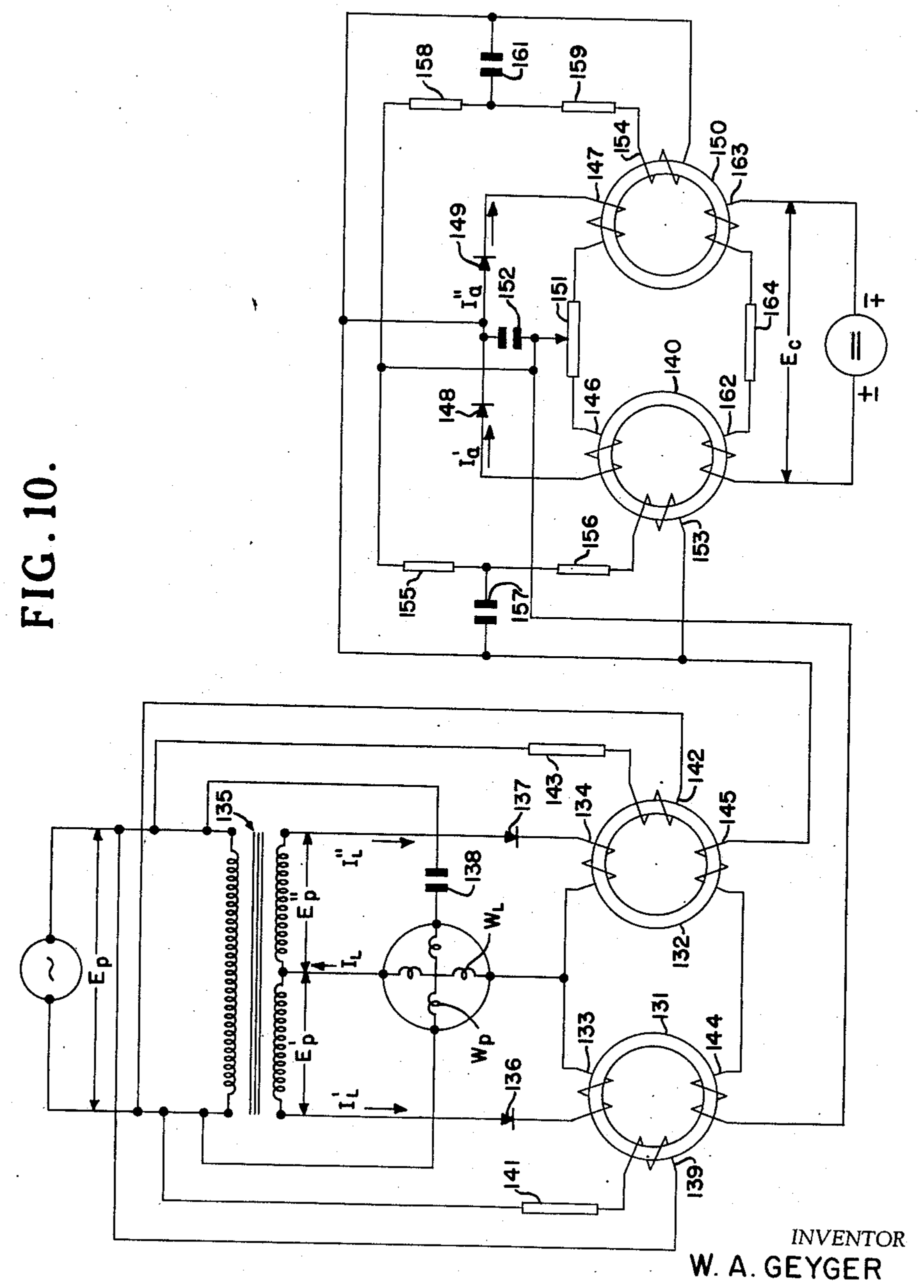
Fig. 10 is a schematic diagram of a modified form of two-stage magnetic amplifier motor control circuit in which the input stage is operated by the voltages induced in the control windings of the output stage.

The output stage of the amplifier illustrated in Fig. 9 is the equivalent of the full-wave push-pull amplifier illustrated in Fig. 3 and functions in the same manner. The output stage includes a pair of reactor elements 91 and 92 having load windings 93 and 94, direct current control windings 95 and 96, and bias windings 97 and 98 thereon. The load windings 93 and 94 are energized during alternate half cycles by the voltages $E_p'$ and $E_p''$ from the transformer 99 through asymmetrical conductors 101 and 102. A potentiometer 103 is provided to eliminate the differences in the magnetic properties of the reactor elements. The bias windings 97 and 98 are energized by separate bias circuits including resistors 104 and 105 from supply voltage $E_p$, which bias circuits, as hereinbefore set forth, provide inherent constant current characteristics in the amplifier and set the desired operating level. The direct current control windings 95 and 96 are connected in series through resistor 106 and so arranged as to obtain push-pull action. The amplifier field winding $W_L$ is thus energized by the sum of the load currents $I_L'$ and $I_L''$ which flow during alternate half-cycles of the supply voltage $E_p$, and the line field winding $W_p$ is energized through phasing condenser 107 from the supply voltage $E_p$.

The input stage includes a pair of saturable reactor elements 111 and 112 having load windings 113 and 114, bias windings 115 and 116 and control windings 117 and 118. The alternating voltage induced in the control windings 95 and 96 of the output stage is applied in series with the voltage $E_d$ from the secondary of insulating transformer 119 through asymmetrical conductors 121 and 122 to the load windings 113 and 114. The asymmetrical conductors 121 and 122 are arranged so that the current $I_a'$ flows through load winding 113 during one half cycle of applied voltage and current $I_a''$ flows through load winding 114 during the other half cycle of the applied voltage. The control windings on the input stage are arranged to obtain push-pull action in response to the application of the alternating current control signal $E_c$. Thus, for a given control voltage $E_c$, the flux due to the control current in the control winding will aid the flux due to the load current in the load winding on one reactor element and oppose the flux due to the load current in the load winding on the other element. The differential load current $I_a'-I_a''$ which flows through the control windings 95 and 96 on the output stage thus includes a direct current component correlative in amplitude and polarity with the amplitude and phase of the alternating current control voltage $E_c'$ relative to the supply voltage $E_p$. Obviously, the control windings 117 and 118 on the input stage may be arranged to obtain push-pull operation of the input stage in response to the application of a direct current control signal, if desired.

With the control voltage $E_c'$ equal to zero, the impedances of the two saturable reactor elements will be equal; the two half-cycle pulses $I_a'$ and $I_a''$ will have the same magnitude, and the resultant output current will have no direct current component. Under these conditions, the resultant current $I_a$ is a pure alternating current which flows through the control windings 95 and 96 on the output stage and produces a voltage sensitive alternating current bias effect, thereby effecting constant current characteristics.

When the alternating control voltage $E_c'$ applied to the control circuit including control windings 117 and 118 is other than zero, the impedances of the two saturable reactor elements 111 and 112 will have different values and the two half-cycle pulses $I_a'$ and $I_a''$ will have a direct current component which is a function of the control voltage $E_c$. The direction of the direct current component of the resultant current $I_a$ will correspond to the phase displacement [0° or 180°] between the error voltage $E_c$ and the supply voltage $E_p$.

The alternating current component of the current $I_a$ which flows through the input stage produces alternating current bias effects on the output stage and reduces the value of the quiescent current in the output stage. It is necessary, therefore, to regulate the amplitude of the alternating current component of the input stage load current and for this purpose, a phase-correcting condenser 123 may be provided to reduce the value of the input stage load current flowing through the output-stage control windings 95 and 96 to the proper level.

In order to effect constant-current characteristics in the input circuit, separate bias circuits which produce bias correlative with the supply voltage $E_p$ are provided. Bias windings 115 and 116 are energized by the voltage $E_d$ from transformer 119 through separate bias circuits including bias resistors 124 and 125, the bias circuits being adjusted to establish the proper operating level of the reactor elements. The control windings 117 and 118 are series connected through resistor 126 and arranged so as to obtain push-pull action in response to the application of control voltage $E_c'$. If an alternating control voltage is applied, the control windings will be arranged as illustrated in Fig. 9, whereas if a direct current control signal is applied, one of the control windings must be reversed to obtain push-pull action.

Fig. 10 illustrates a modified form of input stage in which the induced voltages in the control windings on the output stage are utilized to supply the two self-saturating circuits of the push-pull input stage. As in the preceding embodiment, the output stage includes a pair of saturable reactor elements 131 and 132 having load windings 133 and 134 energized by voltages $E_p'$ and $E_p''$ from the secondary of transformer 135 through asymmetrical conductors 136 and 137, the latter being arranged so that load current $I_L'$ flows through winding 133 on one half cycle of supply voltage $E_p$ and load current $I_L''$ flows through the load winding 134 on the other half cycle of supply voltage. The amplifier field winding $W_L$ of a two-phase reversible induction motor is arranged so that the sum of the load currents $I_L'$ and $I_L''$ flows therethrough. The line field winding $W_p$ of the motor is energized through phasing capacitor 138.

Separate bias circuits are provided for the reactor elements, the bias winding 139 on reactor element 131 being energized from the supply source $E_p$ through resistor 141, the bias winding 142 being energized through resistor 143. The control windings 144 and 145 are arranged to effect push-pull action in response to the application of a direct current control signal which, in the embodiment illustrated, is supplied by the self-saturating input stage.

As hereinbefore set forth, a magnetic amplifier push-pull circuit containing two saturable reactor elements in each stage has the property that fundamental frequency voltages will be induced in the control windings. By increasing the number of turns on the control windings 144 and 145, these induced voltages can be made sufficiently large to supply the input stage.

The input stage includes saturable reactor elements 148 and 150 having load windings 146 and 147 energized through asymmetrical conductors 148 and 149. The conductors are arranged so that current $I_a'$ flows through load winding 146 during the negative half-cycles of the voltage induced in control windings 144 and 145 and load current $I_a''$ flows through winding 147 during the positive half-cycles. Potentiometer 151 is provided to permit adjustment to eliminate the effects due to differences in the magnetic properties of the saturable reactors and differences in the characteristics of the dry disk rectifiers 148 and 149. Condenser 152 is provided to reduce the value of the alternating current component of the input stage load current, and is connected in shunt with the control windings 144 and 145.

Proper operating level of the input stage is achieved by bias windings 153 and 154 which are energized by the induced voltages in control windings 144 and 145 through separate bias circuits. To obtain the proper phase between the bias and load circuits, phasing circuits including resistors 155, 156 and condenser 157; and resistors 158, 159 and condenser 161 are provided.

As in the preceding embodiment, control windings 162 and 163 are provided on reactor elements 140 and 150 respectively and are series connected through resistor 164 to effectuate push-pull action in response to the application of control voltage $E_c$.

Figure 11:
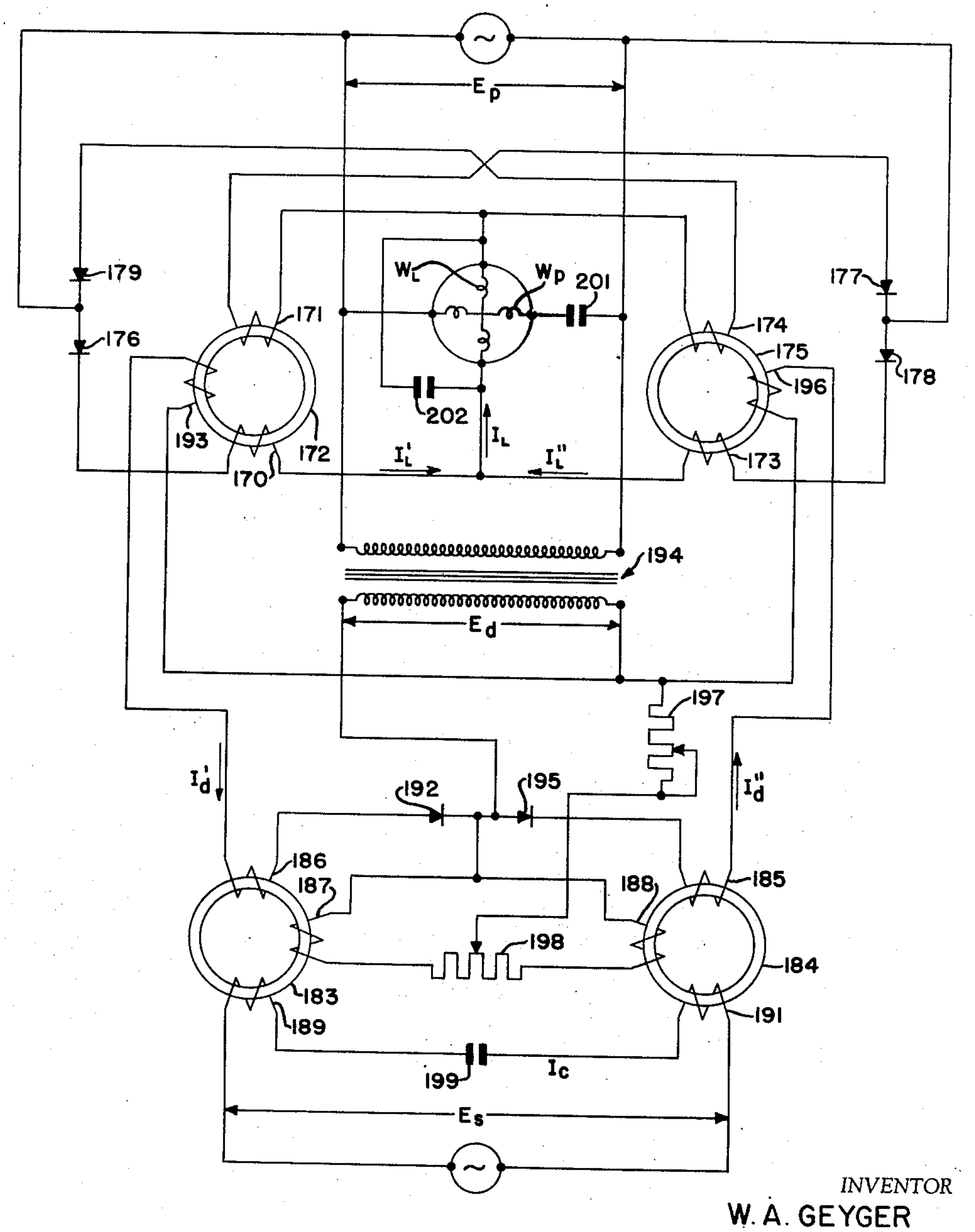
Fig. 11 is a schematic diagram of another modification of a two-stage magnetic amplifier control circuit having inherent dynamic braking characteristics.

Fig. 11 illustrates a two-element bridge-type full-wave output circuit arranged for push-pull operation and having the amplifier field windings $W_L$ of a two phase reversible motor connected so that the sum of the load currents $I_L'$ and $I_L''$ flows therethrough. In this manner the direction and speed of rotation as well as the magnitude of the damping current is controlled by the error signal applied to the control windings thereof.

The split load windings 170 and 171 on saturable reactor element 172 and split load windings 173 and 174 on saturable reactor element 175 constitute the four legs of the bridge. During the positive half cycles of supply voltage $E_p$, load current $I_L'$ flows through asymmetrical conductor 176, load winding 170, amplifier field winding $W_L$, load winding 171 and asymmetrical conductor 177, and during the negative half cycles current $I_L''$ flows through asymmetrical conductor 178, load winding 173, amplifier field winding $W_L$, load winding 174 and asymmetrical conductor 179.

The input stage includes reactor elements 183 and 184, load windings 185 and 186, bias windings 187 and 188, and control windings 189 and 191. The load winding 186 is series connected with asymmetrical conductor 192 and output-stage control winding 193 across the secondary of transformer 194, and the load winding 185 in series connected with asymmetrical conductor 195 and output-stage control winding 196 across the secondary of transformer 194. The asymmetrical conductor 192 is arranged so that the input stage load current pulse $I_d'$ flows through control winding 193 on the output stage during that half cycle of supply voltage $E_p$ in which output stage load current pulse $I_L'$ does not flow through load windings 170 and 171, and similarly the rectifier 195 is arranged so that input stage load current pulse $I_d''$ flows through control winding 196 during that half cycle of voltage $E_p$ in which output stage load current pulse $I_L''$ does not flow.

Bias for the input stage is provided by separate voltage sensitive bias circuits which are connected through variable resistor 197 to the secondary of transformer 194, a balancing potentiometer 198 being provided to permit individual adjustment of the operating levels of the reactor elements and thereby eliminate the differences in magnetic properties of the reactor elements. The control windings 189 and 191 on the input stage are connected in series with phasing condenser 199 and arranged to obtain push-pull action in response to the control voltage $E_s$.

The load currents $I_d'$ and $I_d''$ of the input stage which flow through the control windings 193 and 196, vary in relative magnitude in accordance with the amplitude and phase of the error signal $E_s$, the load currents $I_d'$ and $I_d''$ being equal when the error signal $E_s$ is zero. When the current pulses $I_d'$ and $I_d''$ in the control windings 193 and 196 respectively of the output stage are equal, the impedances of reactor elements 172 and 175 are equal, and load current pulses $I_L'$ and $I_L''$ are equal. The sum of the load currents $[I_L'+I_L'']$ which flows through the amplifier field winding $W_L$ is thus a pulsating unidirectional current having no alternating current component of fundamental frequency.

However, when there is an error signal $E_s$, the magneto-motive force due to the push-pull arranged control windings 189 and 191 on the input stage aids the magneto-motive force due to the load current in the load windings on one input stage reactor element and opposes the magneto-motive force due to the load current in the load windings on the other input stage reactor element. Thus, the load current pulses $I_d'$ and $I_d''$ will have different magnitudes and produce relatively different magneto-motive forces in the output stage reactor elements 172 and 175. The load current pulses $I_L'$ and $I_L''$ will then have relatively different magnitudes and the sum of the load currents $[I_L'+I_L'']$ which flows through the amplifier field winding $W_L$ of the motor will have a direct current and an alternating current component.

The line field winding $W_p$ is energized from the source voltage $E_p$ through phasing condenser 201 and a condenser 202 is provided in shunt with the amplifier field winding.

As is apparent, the current pulses $I_d'$ and $I_d''$ bias the output stage, the magnitude of this bias on the output stage being controllable by the amount of bias applied to the input stage. Thus, separate output stage bias circuits are not necessary. Further, since voltage sensitive bias circuits are employed in the input stage, the output stage bias will also be regulated by the supply voltage and the amplifier accordingly has constant current characteristics.

From the foregoing it is apparent that the direction and speed of rotation of a two-phase induction motor, as well as the dynamic braking thereof may be controlled by a magnetic amplifier having two reactor elements in the output stage. This is achieved by passing a current through the load windings on one reactor element during one half cycle of supply voltage and through the other reactor element during the other half cycle of supply voltage, the load current pulses being applied to the amplifier field winding of a two-phase induction motor in such a manner as to produce additive direct current effects; that is each of the load current pulses flow in the same direction through the field winding. The control windings on the reactor elements are arranged so that the error signal applied thereto differentially varies the impedances of the reactor elements whereby the load current pulses have differential magnitudes correlative with the amplitude and polarity or phase of the control signal. The total current flowing through the field winding is thus a unidirectional current having a direct current and an alternating current component, the former being a maximum and the latter being zero when the control signal is zero. The direct current component decreases, and the alternating component increases with increasing control signal.

Obviously many modifications and variations of the present invention are possible in the light of the above teachings. It is therefore to be understood that within the scope of the appended claims the invention may be practiced otherwise than as specifically described.

What is desired to be secured by Letters Patent of the United States is:

1. A magnetic amplifier control circuit for a two-phase induction motor having first and second field windings comprising a pair of saturable reactor elements each having a saturating winding thereon, means including an alternating current source and asymmetrical conducting elements for feeding current through the load winding on one reactor element during one half-cycle of the alternating current and through the load winding on the other reactor element during the other half-cycle of said alternating current, means for applying the load currents from the load windings on each reactor element to said first field winding of said motor to produce additive direct current effects in said first field winding, means including control windings on each of said reactor elements for differentially varying the impedances of said reactor elements in response to the application of a control signal to said control windings, and means for feeding an alternating current to said second field winding in quadrature with the alternating current component of the current in said first field winding.

2. A magnetic amplifier control circuit for a two-phase induction motor having first and second field windings thereon comprising a pair of saturable reactor elements each having load winding thereon, a first circuit including the load winding on one of said reactor elements, an asymmetrical conducting element and said first field winding of said motor, a second circuit including the load winding on the other reactor element, an asymmetrical conductor and said first field winding of said motor, means for applying an alternating voltage to said circuits, said asymmetrical conductors being arranged so that current flows through the load winding on one reactor element and in a predetermined direction through said first field winding during one half cycle of said alternating voltage and through the load winding on the other reactor element and in said predetermined direction through the field winding of said motor during the other half cycle of said alternating voltage, means responsive to a control signal for differentially varying the impedances of said reactor elements, and means for applying a voltage in quadrature phase relation to said alternating voltage to said second field winding.

3. A magnetic amplifier control circuit for a two-phase induction motor having first and second field windings comprising a pair of saturable reactor elements each having a saturating load winding thereon, means including an alternating current source and asymmetrical conducting elements for feeding current through the load winding on one reactor element during one half-cycle of the alternating current and through the load winding on the other reactor element during the other half-cycle of said alternating current, means for applying the load currents from the load windings on each reactor element to said first field winding of said motor to produce additive direct current effects in said first field winding, control windings on each of said reactor elements arranged to effect push-pull operation of said amplifier in response to the application of a control voltage to said control windings, and means for feeding an alternating current to said second field windings in quadrature with the alternating current component of the current in said first field winding.

4. The combination of claim 1 including adjustable means for equalizing the current pulses through the load windings on the separate reactor elements when the control voltage is zero.

5. The combination of claim 1 including means for biasing said reactor elements in accordance with the amplitude of the alternating voltage applied to the load windings thereby introducing constant current characteristics in the amplifier.

6. A magnetic amplifier control circuit for a two-phase induction motor having first and second field windings comprising a first pair of saturable reactor elements having self saturating load windings thereon, a source of alternating voltage, a first circuit means including an asymmetrical conducting element and said first field winding for passing a current pulse through the load winding on one reactor element and through said first field winding during one-half cycle of said alternating voltage, second circuit means including an asymmetrical conducting element, said first field winding and the load winding on the other of said reactor elements for passing a current pulse through the load winding on the other reactor element and through said first field winding during the other half-cycle of said alternating voltage, said first and second circuit means being arranged so that the current pulses passing therethrough produce additive direct current effects in said first field winding, means including control windings on said reactor elements responsive to a direct current control signal for differentially varying the impedances of said reactor elements in accordance with the amplitude and polarity of said control signal, and means for energizing said second field windings of said motor.

7. A magnetic amplifier control circuit for a two-phase induction motor having first and second field windings comprising a first pair of saturable reactor elements having self saturating load windings thereon, a source of alternating voltage, a first circuit means including an asymmetrical conducting element and said first field winding for passing a current pulse through the load winding on one reactor element and through said first field winding during one-half cycle of said alternating voltage, second circuit means including an asymmetrical conducting element, said first field winding and the load winding on the other of said reactor elements for passing a current pulse through the load winding on the other reactor element and through said first field winding during the other half-cycle of said alternating voltage, said first and second circuit means being arranged so that the current pulses passing therethrough produce additive direct current effects in said first field winding, control windings on each of said first pair of reactor elements arranged to effect push-pull operation of said magnetic amplifier in response to a direct current signal applied thereto, a polarized magnetic amplifier input circuit for producing an output current having a direct current component correlative with a control voltage applied thereto, said input circuit including a pair of saturable reactor elements having load windings thereon, means including a pair of unidirectional conducting elements, the load windings of said input circuit and the control windings on said first pair of reactor elements for energizing the load windings on said second pair of reactor elements.

8. A magnetic amplifier control circuit for a two-phase induction motor having first and second field windings comprising a first pair of saturable reactor elements having self saturating load windings thereon, a source of alternating voltage, a first circuit means including an asymmetrical conducting element and said first field winding for passing a current pulse through the load winding on one reactor element and through said first field winding during one-half cycle of said alternating voltage, second circuit means including an asymmetrical conducting element, said first field winding and the load winding on the other of said reactor elements for passing a current pulse through the load winding on the other reactor element and through said first field winding during the other half-cycle of said alternating voltage, said first and second circuit means being arranged so that the current pulses passing therethrough produce additive direct current effects in said first field winding, series connected control windings on said first pair of reactor elements arranged to effect push-pull operation of said magnetic amplifier in response to a direct current signal applied thereto, said control windings on said first pair of reactor elements having an alternating voltage of the fundamental source frequently induced therein due to the current flow in the load windings on said first pair of reactor elements, a magnetic amplifier input circuit including a second pair of reactor elements having load windings thereon, first and second branch circuit means each including one of the load windings on said second pair of reactor elements and a rectifier element, means connecting the control windings on said first pair of reactor elements to said branch circuits whereby current flows through the load winding on one of said second pair of reactor elements during one-half cycle of the induced alternating voltage in said control windings and through the load winding on the other of said second pair of reactor elements during the other half cycle of said induced voltage, means including control windings on said second pair of reactor elements for operating said input circuit in push-pull in response to a control signal, and means for energizing said second field winding.

9. The combination of claim 8 including transformer means for superimposing an alternating voltage in series with the voltage induced in the control windings on said first pair of reactor elements.

10. A magnetic amplifier control circuit for a two-phase induction motor having first and second field windings comprising a pair of output stage reactor elements having load windings and control windings thereon, means including a source of alternating voltage and asymmetrical conducting elements for causing current to flow through the load windings on one of the output stage reactor elements during one half-cycle of said alternating voltage and through the load windings on the other output stage reactor element during the other half cycle of said alternating voltage, means connecting said first field winding to said output stage load windings whereby the currents flowing through the latter produce additive direct current effects in said first field winding, means including an input stage magnetic amplifier circuit for energizing the control windings on each of said output stage reactor elements during the non-conducting half-cycle of the load winding thereon, said input amplifier providing unidirectional pulses to said output stage control windings having relative amplitudes correlative with a control signal applied to said input amplifier whereby said input stage amplifier differentially varies the impedances of said output stage reactor elements in response to said control signal.

11. The combination of claim 10 including means responsive to said alternating voltage for biasing said input stage amplifier.

12. A magnetic amplifier control circuit for a two-phase induction motor having first and second field windings comprising a pair of saturable reactor cores each having a controlled winding and a control winding wound thereon, means including a source of A. C. potential and said controlled windings for causing said cores to saturate each on alternate half cycles of said A. C. potential, means including the control windings on said cores for differentially varying the firing angles of said cores in response to a control signal, means for applying a pulsating unidirectional current correlative with the current flowing through the controlled windings to said first field winding of said induction motor, and means for energizing said second field winding of said motor.

References Cited in the file of this patent

UNITED STATES PATENTS

| Number | Name | Date |
|---|---|---|
| 2,508,639 | Field | May 23, 1950 |

OTHER REFERENCES

"Magnetic Amplifiers of the Balance Detector Type—Their Basic Principles, Characteristics, and Applications" (Geyer), December 1949, AIEE Miscellaneous Paper, 50–93.